United States Patent Office 2,760,984
Patented Aug. 28, 1956

2,760,984
METHOD OF PURIFYING β-KETOACETALS

George L. Fletcher, Rochester, N. Y., assignor to Eastman Kodak Company, Rochester, N. Y., a corporation of New Jersey No Drawing. Application June 3, 1953,
Serial No. 359,418

6 Claims. (Cl. 260—594)

This invention relates to methods of separating β-ketoacetals from the closely related β-ketovinyl ethers usually present in admixture with the β-ketoacetals.

The β-ketoacetals of the formula

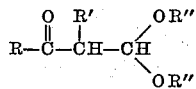

wherein R is an alkyl or aralkyl group, R' is either hydrogen or an alkyl group and R" is an alkyl, aryl or aralkyl group, are useful intermediates in the synthesis of organic compounds such as pharmaceuticals and the like. Ordinarily, the methods of preparation employed for making β-ketoacetals result in products which are contaminated with varying amounts of the closely related β-ketovinyl ether of the formula

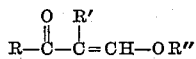

Furthermore, on storage under certain conditions, the β-ketoacetals lose a molecule of alcohol and revert to the corresponding β-ketovinyl ether in greater or lesser degree. The presence of substantial amounts of the β-ketovinyl ether is objectionable because of its close similarity to the β-ketoacetal and its tendency to undergo similar reactions whereby unwanted byproducts are formed.

Because of its close similarity in structure to β-ketoacetal, the β-ketovinyl ether has chemical and physical properties so closely related to the β-ketoacetal that separation of the two materials is extremely difficult by the ordinary separation procedures such as distillation, extraction, and the like. Furthermore, when employed in most syntheses, the products obtained are closely allied in physical properties so as to render separation difficult. In the case of the vitamins, antibiotics and similar materials, however, these minor structural differences are of major importance and may give products of little or no utility for the desired purpose or actually of deleterious character. It is therefore both necessary and desirable to be able to separate the β-ketoacetals from the objectionable amounts of the corresponding β-ketovinyl ether.

It is accordingly an object of this invention to provide a new and highly effective method of purifying β-ketoacetals containing objectionable amounts of the corresponding β-ketovinyl ether.

It is another object of the invention to provide a highly effective method of reducing the β-ketovinyl ether content of β-ketoacetal compositions without deleteriously affecting the β-ketoacetal.

A further object of the invention is to improve the synthesis of material employing β-ketoacetal as an intermediate by reducing the β-ketovinyl ether content of the β-ketoacetal to an unobjectionable level.

Another object of the invention is to provide a simple and economical but highly effective method of purifying β-ketoacetal compositions contaminated with undesirable amounts of the corresponding β-ketovinyl ether.

Another object of the invention is to provide a simple method of treating difficultly separable mixtures of β-ketoacetal and β-ketovinyl ether so as to convert the β-ketovinyl ether to a readily separable form while leaving the desired β-ketoacetal substantially unchanged.

Another object of the invention is to provide an inexpensive method of purifying dialkyl acetals of β-ketobutyraldehyde.

Other objects will be apparent from the description and claims which follow.

These and other objects are attained by means of this invention which comprises adding an alkaline-reacting material to a β-ketoacetal composition contaminated with the corresponding β-ketovinyl ether and selectively polymerizing the β-ketovinyl ether to material of greatly changed physical properties without substantially affecting the β-ketoacetal, and separating the polymerized form of the β-ketovinyl ether from the desired β-ketoacetal.

Ordinarily, the chemical reactivities of the β-ketoacetal and the corresponding β-ketovinyl ether are so closely analogous that they react in like fashion under ordinary reaction conditions. I have found, however, that in the presence of an alkaline catalyst, the β-ketovinyl ether polymerizes very readily whereas the β-ketoacetal does not and that a mixture of quite dissimilar materials is thereby obtained which can be readily separated by any of the ordinary physical separating techniques suitable for separating dissimilar liquids. Thus for example, the liquid mixture obtained by means of this invention is readily separated into its components by fractional distillation, solvent partition or the like.

The exact nature or extent of the polymerization of the β-ketovinyl ether is not known at this time, and it is likely that a polymeric mixture results and that the degree of polymerization varies with the nature and concentration of the alkaline catalyst, the time and temperature of treating and similar well-known variable factors. Because of the similarity of the β-ketoacetal to the β-ketovinyl ether, it is desirable to effect the process under conditions which are no more drastic than necessary to effect polymerization of substantially all of the β-ketovinyl ether in order that any chance of polymerizing substantial amounts of the β-ketoacetal is obviated. With the weaker alkaline catalysts such as the amines, the catalyst can be added to the mixture and the ketoacetal distilled out of the mixture without substantial loss through polymer formation. With the more active alkaline catalysts such as the alkaline hydroxides, it is desirable to effect the selective polymerization at lowered temperatures and the separation by vacuum distillation or to inactivate the catalyst following the polymerization of the β-ketovinyl ether. Since, like any chemical process, the process embodying the invention is subject to changes in any one or more of the well-known variables of time, temperature, concentrations, etc.; and since the process does not depend for its operability upon any particular or critical conditions, it is not intended that the invention shall be limited in its scope to any particular conditions which are used in illustrating processes embodying the invention.

The β-ketoacetals which can be purified in accordance with this invention include any of the well-known compounds of the formula

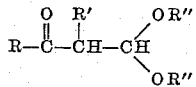

as defined hereinabove, when contaminated by the corresponding β-ketovinyl ether in which one mole of alcohol R"OH has split off from the β-ketoacetal. Thus R can be an alkyl group such as methyl, ethyl, propyl, butyl or the like or an aralkyl group such as phenyl methyl, phenyl ethyl or the like. R' is usually hydrogen but can be an alkyl group such as methyl, ethyl, propyl, butyl or the like R" is usually an alkyl group for convenience such as methyl, ethyl propyl or butyl but can be an aryl group such as phenyl tolyl, or the like, or an aralkyl group such as phenyl methyl, phenyl ethyl or the like. Compounds which are of particular utility in the synthesis of pharmaceuticals are the β-ketobutyracetals and the α-alkyl β-ketobutyracetals which are readily purified by means of this invention. Typical of these latter compounds are 4,4-dimethoxy-2-butanone, 4,4-diethoxy-2-butanone, 4,4-dimethoxy-3-methyl-2-butanone, 4,4-diethoxy-3-methyl-2-butanone and the like.

The β-ketovinyl ethers which are separated from the β-ketoacetals by means of this invention are those which correspond to the β-ketoacetal being purified except for the absence of an R"OH molecule whereby the compound has the formula

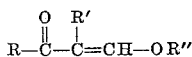

in which R, R' and R" correspond to those same groups in the β-ketoacetal. These β-ketovinyl ethers are readily polymerized by the presence of any of the well-known alkaline-reacting materials such as the amines, ammonia, alkaline carbonates, alkaline hydroxides and the like. Of these materials, the amines such as diethanolamine, pyridine and the like are preferred but such materials as sodium carbonate, potassium carbonate, and the alkali metal and alkaline earth hydroxides can be used particularly when used in small amounts and under mild conditions. The amount of alkaline catalyst can, of course, be varied within wide limits depending upon the temperatures and times employed. In the case of the amines such as diethanolamine amounts as high as 20% by weight of the mixture being treated or higher can be used whereby the selective polymerization proceeds during the distillation although amounts as low as 1% or lower can be used with longer times being employed for polymerization to take place. In the case of the more strongly alkaline catalysts, the catalyst is effective at amounts below 1% or as low as 0.1% or lower and such low amounts are desirably employed for best separation although larger amounts can be used at temperatures below room temperature. Of the alkaline materials, diethanolamine is particularly suitable as catalyst since it readily polymerizes the β-ketovinyl ether without polymerizing the β-ketoacetal under ordinary room conditions and during vacuum distillation and hence no precautions are necessary to control the polymerization.

Although the exact nature of the polymeric β-ketovinyl ether is not known, the treatment with alkaline material gives a material having a greatly increased molecular weight and exhibiting an ultraviolet absorption at an entirely different wave length than does the original contaminant. Separation of the polymeric material from the β-ketoacetal can therefore be readily effected by any of the well-known liquid separation methods. Fractional distillation and particularly vacuum fractional distillation is preferred, although adsorption, solvent partition or the like are entirely suitable.

The invention is illustrated by the following example of a typical embodiment thereof.

*Example*

A 200 g. batch of impure β-ketobutyrdimethyl acetal having $$E^{1\%}_{1\text{cm.}}(244m\mu) = 104$$

and containing 9% by weight of the corresponding β-ketovinyl ether was charged into a vacuum pot still. To this was added 30 g. of diethanolamine and the mixture was heated to 55–60° C. and subjected to a reduced pressure of 5–10 mm. Hg. The β-ketobutyrdimethyl acetal was distilled out and amounted to 165 g. of product having E (1%, 1 cm. 244mμ)=5.0. This product contained less than 0.5% of β-ketovinyl ether. The residual polymeric material left in the still adsorbed ultraviolet light at 306 mμ. Similar results are obtained with the other β-ketoacetals using this or other alkaline catalysts.

The invention thus provides a simple but highly effective method of separating β-ketoacetal from the corresponding β-ketovinyl ether which is only difficultly separable from it by usual means.

Although the invention has been described in detail with particular reference to certain preferred embodiments thereof, it will be understood that variations and modifications can be effective within the spirit and scope of the invention as described hereinabove and as defined in the appended claims.

I claim:

1. The method of treating a β-ketoacetal composition containing the corresponding β-ketovinyl ether as a difficultly separable contaminant which comprises selectively polymerizing said β-ketovinyl ether contaminant without substantially affecting said β-ketoacetal by means of an alkaline-reacting catalyst at least as basic as diethanolamine, and separating the resulting polymerized β-ketovinyl ether from said β-ketoacetal.

2. The method which comprises admixing an alkaline-reacting catalyst having a basicity at least equal to diethanolamine with a β-ketoacetal composition containing a minor amount of the corresponding β-ketovinyl ether and selectively polymerizing said β-ketovinyl ether without substantially affecting said β-ketoacetal, and fractionally distilling said β-ketoacetal from the resulting mixture.

3. The method which comprises admixing an amine having a basicity at least equal to diethanolamine with a mixture of β-ketoacetal and the corresponding β-ketovinyl ether, and fractionally distilling β-ketoacetal from the resulting mixture.

4. The method which comprises admixing diethanolamine with a mixture of β-ketoacetal and the corresponding β-ketovinyl ether, and subjecting the resulting mixture to fractional distillation whereby said β-ketoacetal is distilled off and said β-ketovinyl ether remains as a polymeric residue.

5. The method which comprises admixing an alkaline-reacting catalyst at least as basic as diethanolamine and a dialkyl acetal of β-ketobutyraldehyde contaminated with the corresponding β-ketovinyl ether and selectively polymerizing said β-ketovinyl ether without substantially affecting said acetal, and separating said acetal from the polymerized β-ketovinyl ether.

6. The method which comprises admixing diethanolamine with a dialkyl acetal of β-ketobutyraldehyde containing a substantial amount of the corresponding β-ketovinyl ether as contaminant, and subjecting the resulting mixture to fractional distillation to separate said acetal from the resulting polymeric β-ketovinyl ether.

References Cited in the file of this patent

UNITED STATES PATENTS

| | | |
|---|---|---|
| 2,104,002 | Reppe et al. | Dec. 28, 1937 |
| 2,232,761 | Balthis | Feb. 25, 1941 |

FOREIGN PATENTS

| | | |
|---|---|---|
| 484,599 | Great Britain | May 9, 1938 |
| 584,121 | Great Britain | Jan. 7, 1947 |

OTHER REFERENCES

Schildknecht: "Vinyl and Related Polymers," Wiley & Sons, Inc., N. Y. 1952 (p. 683).